United States Patent [19]

Brewer et al.

[11] Patent Number: 5,232,415

[45] Date of Patent: Aug. 3, 1993

[54] DIFFERENTIAL WITH VARIED FRICTIONAL SURFACES

[75] Inventors: Mark S. Brewer, North Chili; Gene A. Stritzel, Rochester; Thomas B. Ryan, Webster, all of N.Y.

[73] Assignee: Zexel-Gleason USA, Inc., Rochester, N.Y.

[21] Appl. No.: 602,735

[22] Filed: Oct. 24, 1990

[51] Int. Cl.$^5$ .............................................. F16H 1/38
[52] U.S. Cl. .................................... 475/227; 475/226; 475/333
[58] Field of Search ............... 475/159, 160, 226, 227, 475/333, 344

[56] References Cited

U.S. PATENT DOCUMENTS

| | | | |
|---|---|---|---|
| 1,373,657 | 4/1921 | Finerock | 475/227 |
| 1,397,066 | 11/1921 | Williams | 475/227 |
| 2,631,475 | 3/1953 | Gleasman | 475/227 |
| 2,859,641 | 11/1958 | Gleasman | 475/227 |
| 4,191,071 | 3/1980 | Gleasman et al. | 475/227 |
| 4,724,721 | 2/1988 | Gleasman et al. | 475/160 |
| 4,730,517 | 3/1988 | Hamano et al. | 475/333 X |
| 4,805,487 | 2/1989 | Pedersen | 475/226 |
| 4,878,400 | 11/1989 | Kimura et al. | 475/227 |
| 4,890,511 | 1/1990 | Pedersen | 475/160 |
| 4,926,711 | 5/1990 | Arakawa | 475/227 |
| 4,926,712 | 5/1990 | Stritzel | 475/227 |
| 4,954,122 | 9/1990 | Nakao et al. | 475/227 X |
| 5,127,889 | 7/1992 | Suzuki | 475/227 OR |

FOREIGN PATENT DOCUMENTS 0004127 7/1986 PCT Int'l Appl. ................ 475/226

Primary Examiner—Leslie A. Braun
Assistant Examiner—Daniel Wittels
Attorney, Agent, or Firm—Eugene Stephens & Associates

[57] ABSTRACT

Frictional effects at different gear mounting surfaces within a differential are varied to control bias ratio. The gearing arrangement includes side gears respectively coupled to axle ends and element gears which transfer and divide torque between the side gears. Coefficients of friction at end faces of the element gears are varied between different element gears to control overall bias ratio while minimizing the effect of changes in overall bias ratio on an inherent bias ratio imbalance between opposite directions of differentiation. Helical gear portions are formed at the ends of the element gears to better balance thrust forces acting on different element gears.

14 Claims, 5 Drawing Sheets

DIFFERENTIAL WITH VARIED FRICTIONAL SURFACES

TECHNICAL FIELD

The invention relates to differentials used in motor vehicle drive lines and, in particular, to differentials which include worm or helical type gear arrangements mounted on crossed, nonintersecting axes.

DESCRIPTION OF PROBLEM AND RELATED ART

A differential of the type contemplated in this invention is described in U.S. Pat. No. 2,859,641, issued Nov. 11, 1958, to Gleasman. This patent is incorporated herein by reference to the extent necessary to provide specific details of the structure of the known differential assembly.

The known differential assembly includes a gear housing, a pair of bores formed in the sides of the housing for receiving a pair of drive axle ends, and a gear arrangement mounted within a main body portion of the housing for driving the axles. The gear housing includes a flange formed at one end for receiving a ring gear or other means for providing power input to the differential from a drive shaft of a vehicle. The gear housing also includes a removable cap at its other end to provide access for mounting the gear arrangement within the housing.

The gear arrangement includes a pair of helical worm gears individually coupled to each axle end as "side" gears, together with so-called "element" gears that are mounted within the housing and in mesh with the side gears for transferring and dividing torque between the axle ends. The element gears are mounted in pairs within slots, or windows, formed in the main body portion of the housing. The two element gears of each pair include respective axes of rotation that are parallel to each other, but are crossed and nonintersecting with respect to a common axis of rotation of the side gears. Typically, the side gears are interconnected by three pairs of element gears that are mounted in the housing at even angular increments about the periphery of the side gears.

The element gears are in reality combination gears, i.e., the middle portion of each gear is formed as a worm wheel and the outer end portions of the gear are formed as spur gears. The gear arrangement is such that, for any given pair of element gears, the worm wheel portion of a first element gear meshes with one side gear, the worm wheel portion of a second element gear of the pair meshes with the other side gear, and the spur gear portions of the respective element gears mesh with each other.

The two side gears have teeth that are inclined at helix angles in the same general direction. In other words, the teeth of both side gears twist in the same direction along their common axis of rotation. Although it is possible to incline the teeth of each side gear to different helix angles or to incline the teeth of both side gears in either direction (i.e., clockwise or counterclockwise), both side gears must be inclined in the same general direction to provide for appropriate directions of their relative rotation.

The entire gearing arrangement within the differential supports opposite directions of relative rotation between the drive axle ends (i.e., differentiation), which is necessary to permit the axle ends to be driven at different speeds with respect to the differential housing. Torque transmitted to the drive axles through the inclined tooth surfaces of the side gears generates thrust forces against gear mounting surfaces within the differential. The thrust forces, together with loads conveyed by the gear meshes, produce a frictional resistance to relative rotation between the drive axles proportional to the torque applied to the differential housing. The proportional frictional resistance supports different amounts of torque between the two drive axles up to a characteristic "bias" ratio of torques between the axles required to induce differentiation. Differentials, like the one described herein, that divide torque in a substantially constant ratio between relatively rotating drive axles are referred to as "torque proportioning" differentials.

The ability to support different amounts of torque between the drive axles is of great benefit to improving traction capabilities of vehicles. Ordinarily, when one wheel of a vehicle with a conventional differential loses traction, the amount of torque that can be delivered to the other drive wheel is similarly reduced. However, torque proportioning differentials provide for delivering an increased amount of torque to the drive wheel having better traction up to the characteristic bias ratio of the differential.

In certain torque proportioning differentials, including the one described herein, bias ratio is affected by opposite directions of relative rotation between the drive axles. In other words, bias ratio is different in one direction of differentiation than in the other direction. Although the bias ratio imbalance of current differential designs is generally not noticeable during vehicle operation, the bias ratio in one direction of differentiation must be higher than the minimum required bias ratio in the other direction of differentiation. The higher than necessary bias ratio in the one direction adds to the amount of friction that must be accommodated by the differential design. In addition, the bias imbalance also concentrates thrust forces against certain mounting surfaces that must be designed to withstand the increased loads.

Reasons for this imbalance between bias ratios have been explained before. In fact, three patents commonly owned herewith are known to treat the problem. Two of these patents, namely, U.S. Pat. No. 4,805,487 and 4,890,511, both to Pedersen, include a mathematical analysis of the problem. The third commonly owned patent, namely, U.S. Pat. No. 4,191,071 to Gleasman et al., includes a less detailed explanation of the problem, but proposes a solution consistent with the later analysis in the Pedersen patents.

In general, the imbalance problem can be traced to the common helix angle direction of the teeth in both side gears. Drive torques applied to the side gear teeth produce thrust forces along the common axis of the side gears proportional to their respective helix angles. Since the helix angles of both side gears are inclined in the same direction, both side gears are thrust in the same direction against one end of the differential housing. The side gear closest to the end of the housing against which the side gears are thrust by drive torque is referred to as the "bottom" side gear and the other side gear, which is thrust against the bottom side gear, is referred to as the "top" side gear.

The total torque received by the drive axles is substantially equal to the drive torque applied to the differential housing. There are two ways in which the drive torque of the housing is transmitted to the side gears and associated axles. One way is to apply the drive torque through the element gears to the side gear teeth, and the other way is to apply the drive torque through frictional interfaces between the housing and the end faces of the side gears. However, frictional torques at side gear interfaces that resist any faster rotation of either side gear with respect to the housing oppose the transmission of housing drive torque to the axles and must be overcome by applying more torque to the side gear teeth or other side gear frictional interfaces with the housing.

Since the drive torque of the housing applied to the side gear teeth also thrusts both side gears against the same end of the differential housing, regardless of the direction of differentiation, only one frictional interface, located between the bottom side gear and housing, is effective for communicating frictional torques between the side gears and housing. The frictional torques at the interface between the bottom side gear and housing oppose both directions of differentiation. However, frictional torque generated in opposition to the slower rotation of the bottom side gear with respect to the housing delivers a portion of the housing drive torque to the end face of the bottom side gear. Correspondingly less drive torque is transmitted to the drive axles by the side gear teeth. However, faster rotation of the bottom side gear is resisted by an opposite direction of frictional torque at the same interface, requiring a corresponding amount of additional drive torque to be conveyed by the side gear teeth.

Although the total amount of torque delivered to the two axles remains equal to the torque applied to the housing in both directions of differentiation, the element gears convey less torque to the side gear teeth when the direction of differentiation rotates the bottom side gear slower than the housing, and the element gears convey more torque to the side gear teeth when the direction of differentiation rotates the same gear faster than the housing. Since torque applied to the side gear teeth also produces thrust forces against the end faces of the gearing throughout the differential, friction developed at the end faces of the gears and gear meshes is higher in one direction of differentiation than the other, resulting in different bias ratios between the two directions of differentiation.

The above-identified patent to Gleasman et al. proposes to control the imbalance problem by using a friction reducing washer between the bottom side gear and housing. Although the reduction in friction at the named interface reduces the bias imbalance, overall bias ratio in both directions of differentiation is also reduced. In addition, since it is not possible to totally eliminate friction between the bottom side gear and housing, some imbalance remains.

The earlier of the two above-identified Pedersen patents eliminates the bias imbalance problem in the forward drive direction of torque transmission through the differential by separately supporting the top side gear against the housing. The separate mounting for the top side gear prevents axial thrust of the top side gear from adding to the thrust of the bottom side gear at the interface between the bottom side gear and housing. Also, since the two side gears rotate in opposite directions, the frictional torque developed between the top side gear and housing opposes the frictional torque between the bottom side gear and housing. However, the solution may be costly in the provision of a special mounting for the top side gear. Another special mounting would be needed for the bottom side gear to eliminate the torque balance in the reverse drive direction.

The latter Pedersen patent discloses a washer rotatively fixed to the housing between the two side gears. One side of the washer next to the bottom side gear is coated with a friction reducer, and the other side of the washer next to the top side gear is coated with a friction enhancer. Without the washer, frictional torques developed at the interface between the side gears are equal in magnitude, but opposite in direction. As a result, the frictional torques between side gears ordinarily have no net effect on the transmission of housing torque to the drive axles. However, by reducing friction on one side of the fixed washer and increasing friction on the other side, resistance to rotation of the bottom side gear is reduced and resistance to rotation of the top side gear is increased. The differential friction developed at the interface between the side gears helps to counteract the friction developed at the interface between the bottom side gear and housing. Nevertheless, the solution is limited to controlling bias in the forward driving direction and aggravates the bias imbalance problem in the reverse driving direction.

Accordingly, the known solutions to the bias imbalance problem are either limited to controlling bias in only one drive direction (i.e., forward or reverse) of the vehicle, or significantly reduce overall bias along with the bias imbalance.

SUMMARY OF THE INVENTION

The invention provides for controlling overall bias ratios in both directions of differentiation while minimizing the effect of such changes on the bias ratio imbalance between the two directions of differentiation. In addition, the invention provides for separately controlling overall bias ratios between forward and reverse operating modes of a vehicle, and for controlling a distribution of thrust forces to more evenly divide the forces among different frictional interfaces.

Frictional torques developed between various element gear end faces and the differential housing are affected in two different ways. One way is to vary the material interfaces between the element gears and housing to exhibit different coefficients of friction. The other way is to vary thrust forces exerted by the element gears against the housing. However, for purposes of controlling the distribution of frictional torques, it is also important to distinguish between the end faces of different element gears and between the two end faces of the same element gears.

Element gears in mesh with the top side gear are referred to as top element gears, and the other element gears in mesh with the bottom side gear are referred to as bottom element gears. The two end faces of each element gear are mounted between opposite window walls formed in the differential housing. The element gear end faces that are thrust against one of the opposing window walls in response to the transmission of forward driving torque are referred to as "drive" end faces, and the other end faces of the element gears that are thrust against the other of the opposing window walls by reverse driving torque are referred to as "coast" end faces. The terms "drive" and "coast" end faces are used in reference to the direction of end thrust imparted to the element gears associated with tooth contact between the so-called drive and coast flanks of the ring gear used to rotate the differential.

The coefficients of friction at end faces of the top and bottom element gears also have slightly different effects on bias ratio between opposite directions of differentiation. The bias ratio effects of the coefficients of friction between the drive and coast end faces are also respectively limited to the forward and reverse directions of torque transmissions through the differential. In all, four different bias ratios can be controlled by varying coefficients of friction at different end faces of the element gears.

For example, friction at the drive end of the top element gears tends to increase the bias ratio imbalance between opposite directions of differentiation, whereas friction at the same end of the bottom element gears may be controlled to raise or lower overall bias with little adverse affect on the bias imbalance. However, friction at the coast end faces of the bottom element gears negatively influences the bias imbalance in the reverse drive direction, whereas friction at the same end of the top element gears may be used without the same adverse effect to control overall bias ratio in reverse. Further, the coefficient of friction at the drive end faces of the bottom element gears may be varied independently of the coefficient of friction at the coast end faces of the top element gears to control overall bias ratios between the forward and reverse driving directions.

According to the present invention, different coefficients of friction may be used between the end faces of the top and bottom element gears. Preferably, the coefficient of friction of at least the drive end of the top element gears is reduced with respect to the same end of the bottom element gears. The coefficient of friction at the drive end of the bottom element gear is relatively increased to maintain appropriate bias ratios in both directions of differentiation. For a similar advantage of controlling bias ratios, but in the reverse drive direction, the coefficient of friction at the coast end of the bottom element gears is reduced with respect to the coefficient of friction at the same end of the top element gears. However, it is also preferred to raise the coefficient of friction at the coast end of the top element gears with respect to the coefficient of friction at the drive end of the bottom side gear to provide a slightly higher bias ratio in the reverse drive direction with respect to the forward drive direction.

Among the element gear end faces, the highest thrust forces are received by the drive end faces of the top element gears and coast end faces of the bottom element gears. However, the invention also provides for replacing the spur gear portions at the ends of the element gears with helical gear portions to provide a more uniform distribution of thrust forces at the ends of the element gears.

The helical gear portions of the top and bottom element gears, being in mesh with each other, are provided with helix angles oriented to opposite directions (i.e., clockwise and counterclockwise). Torque transmissions between the mating helical gear portions generate thrust forces in opposite directions along the respective axes of the top and bottom element gears. The thrust forces remain in the same opposite directions during both directions of differentiation, but are directed in different opposite directions between transmissions of forward and reverse driving torque. The oppositely directed thrust forces generated by the helical gear portions either add to or subtract from the thrust forces exerted on the element gears by the respective side gears.

According to the present invention, the opposite directions of helix angle are selected for the gear portions at the ends of the element gears so that in the forward drive direction, thrust forces are generated in the top element gears that subtract the thrust forces exerted on them by the top side gears, and thrust forces are generated in the bottom element gears that add to the thrust forces exerted on them by the bottom side gear. The same selected direction of the helix angles at the ends of the element gears has the opposite effect in the reverse drive direction. That is, thrust is added to the thrust against the coast end face of the top element gear and is subtracted from the thrust exerted against the coast end face of the bottom element gear.

The net effect of this arrangement of helix angles is to more evenly distribute thrust forces on the end faces of the element gears. Although the helix angles also affect the relative amounts of friction at the element gear end faces, a change in helix angles alone has little or no effect on overall bias ratio or the bias imbalance between opposite directions of differentiation. However, the arrangement of helix angles may also be used in conjunction with appropriate variations in coefficients of friction at the different interfaces to better control overall bias ratio while reducing the influence of interfaces which contribute to the imbalance problem.

DRAWINGS

DETAILED DESCRIPTION

Figure 1:
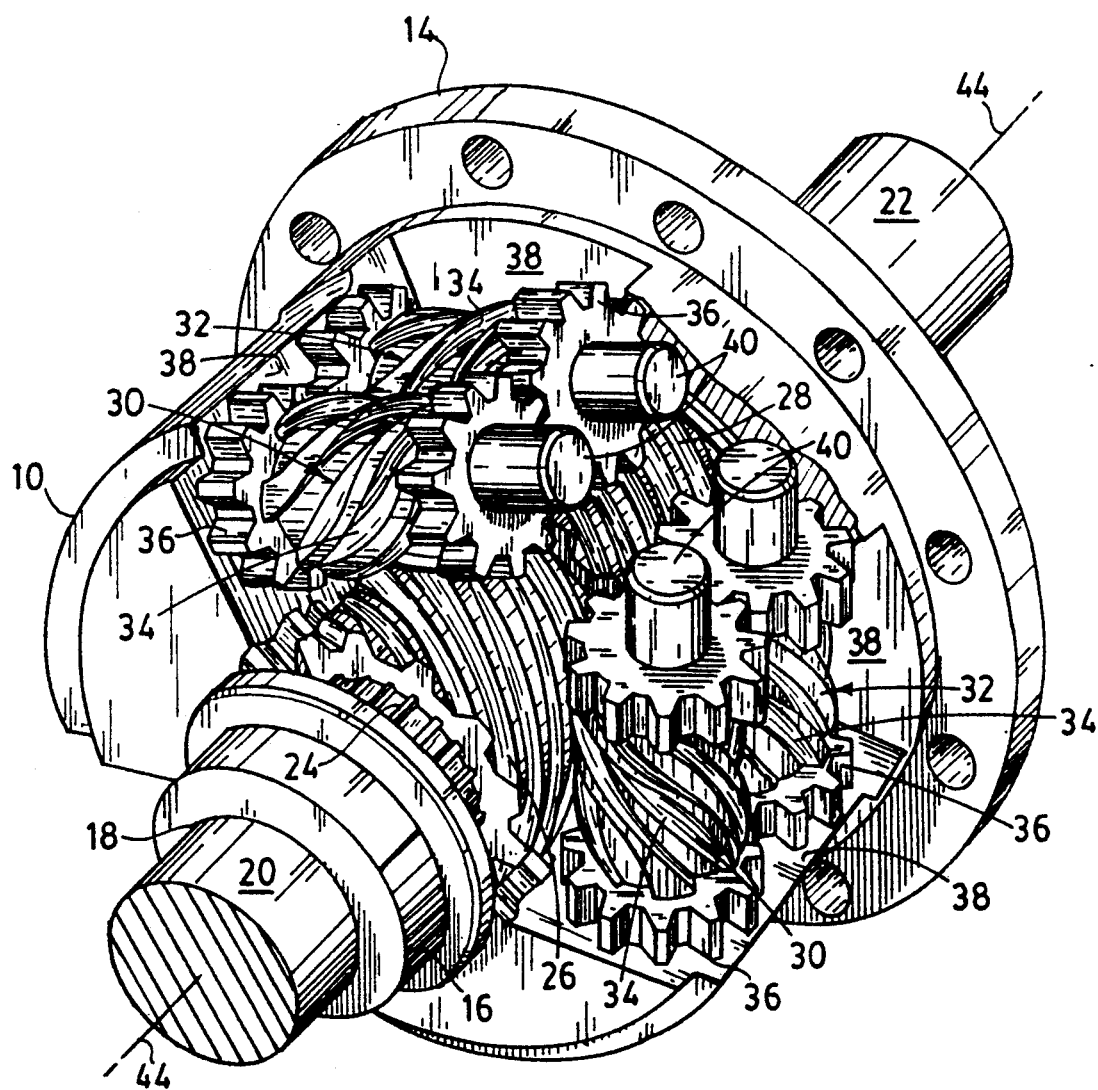
FIG. 1 is a perspective view of a known differential gear assembly with certain parts broken away in section to show the internally mounted gear assembly.
Figure 2:
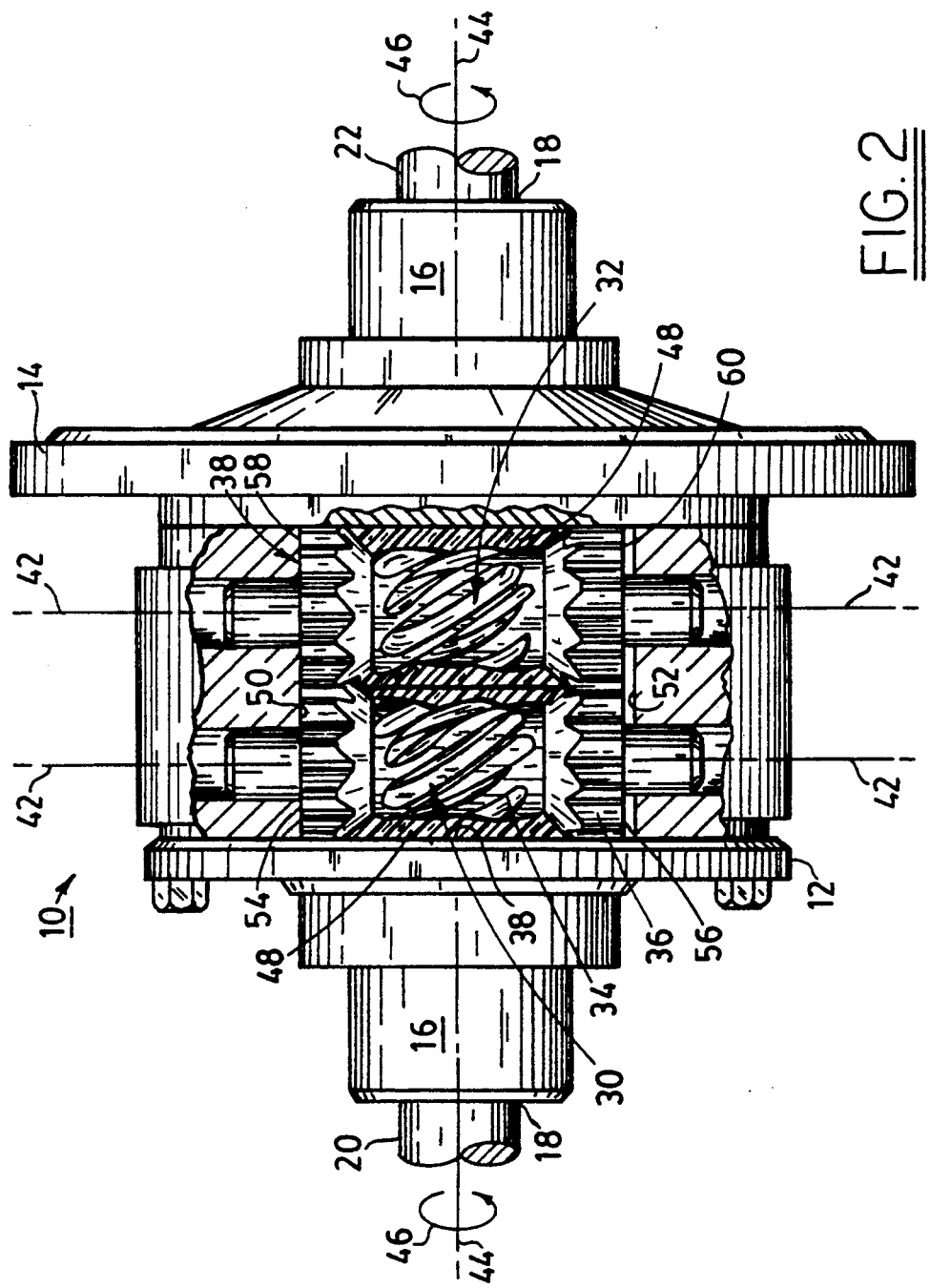
FIG. 2 is a side view of a similar differential assembly having a partly cut away section through the housing.

A known differential assembly similar to the differential assembly of the invention is shown in FIGS. 1 and 2. With particular reference to FIG. 1, it can be seen that the known differential includes a housing 10 with a flange 14 adapted to mount a ring gear (not shown) at one end of the housing for receiving power from a vehicle drive line in a conventional manner. The other end of housing 10 is adapted to receive an end cap 12 shown in FIG. 2. However, it is also a common practice to form the end cap 12 integral with the housing 10.

The differential housing 10 is formed with a pair of trunnions 16 at the two ends having bores 18 for receiving respective drive axle ends 20 and 22 that extend inside the housing into engagement with the gear arrangement. In particular, both axle ends 20 and 22 are formed with external splines 24 that engage mating internal splines of side gears 26 and 28, respectively. The side gears are known to be of the worm or helical gear type.

Each of the side gears 26 and 28 meshes with one member of each of three pairs of element gears 30 and 32. Although only two of the three pairs of element gears 30 and 32 are shown in FIG. 1, it may be understood that the transfer gear pairs are arranged at even one hundred and twenty degree intervals about the periphery of the side gears 26 and 28. Of course, a larger or smaller number of element gear pairs may be used and the even angular interval between them adjusted accordingly.

Each of the element gears 30 and 32 is actually an integral combination of three separate gears. For example, in the known differential illustrated by FIGS. 1 and 2, an hourglass-shaped worm wheel portion 34 is flanked by two spur gear portions 36 at opposite ends. However, it is also known to substitute helical type gearing for either the worm wheel portion 34 or spur portions 36. The middle (worm wheel) portions 34 of the element gears 30 and 32 mesh with respective side gears 26 and 28, and the end (spur) portions 36 of the respective element gears mesh with each other.

Each pair of element gears 30 and 32 is mounted within one of three "windows" or slots 38 that extend inwardly from the periphery of the housing 10. The windows 38 are adapted to receive shafts 40 for rotatively mounting the element gears in the housing about axes of rotation 42 that are crossed and nonintersecting with respect to a common axis of rotation 44 of the side gears, housing, and drive axle ends.

A cross-sectional view of one of the windows 38 is shown in FIG. 2. Arrow 46 indicates the direction of rotation of housing 10 about axis 44 for producing forward motion in a vehicle. The two side gears have teeth 48 that are inclined to the same helix angle direction with respect to the axis 44. As a result, both side gears are thrust by the transmission of forward drive torque toward the same end of housing 10 having flange 14. Side gear 28, which is thrust against the flange end of the housing, is referred to as a "bottom" side gear; and side gear 26, which is thrust against bottom side gear 28, is referred to as a "top" side gear.

Similarly, element gear 32, which meshes with bottom side gear 28, is referred to as a "bottom" element gear; and element gear 30, which meshes with top side gear 26, is referred to as a "top" element gear. Each of the element gears 30 and 32 also includes two end faces 54, 56 and 58, 60, respectively. The transmission of forward driving torque thrusts the end faces 54 and 58 of the two element gears against window wall 50, leaving a small clearance between the end faces 56 and 60 and opposing window wall 52. The end faces 54 and 58 of the element gears are referred to as "drive" end faces, and the opposite end faces 56 and 60 are referred to as "coast" end faces.

However, the transmission of reverse drive torque through the differential produces opposite directions of thrust forces. For example, both the top and bottom side gears 26 and 28 are thrust toward the end of housing 10 having cap 12, and the coast end faces 56 and 60 of the element gears are thrust against the window wall 52. These same directions of thrust forces are also produced by so-called "coasting" torque in which the vehicle's engine is used to brake the forward motion of the vehicle.

Figure 3:
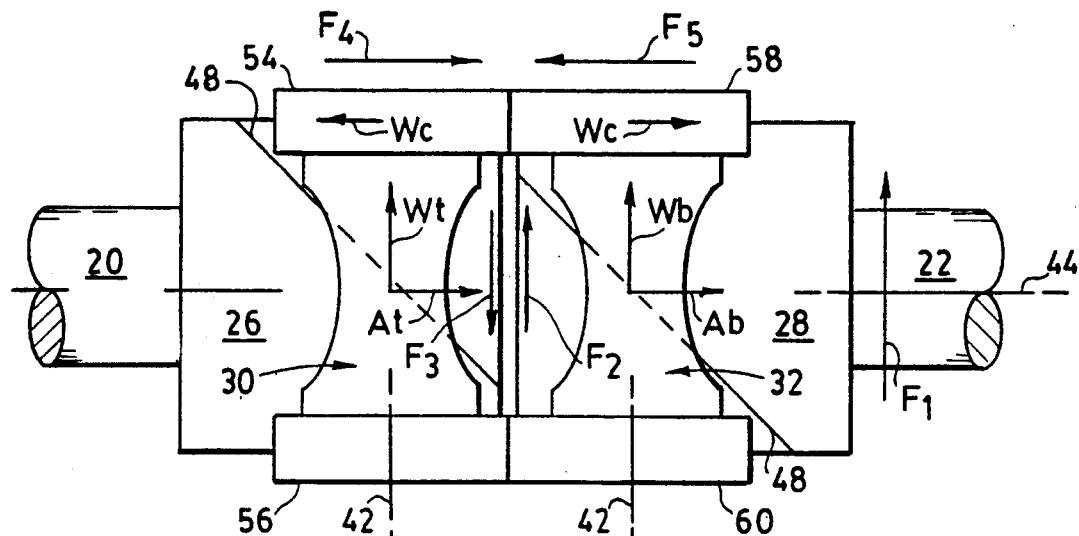
FIG. 3 is a schematic depiction of a single pair of element gears in mesh with two side gears connected to axle ends for referencing forces generated by the transmission of drive torque through the differential in one direction of differentiation.
Figure 4:
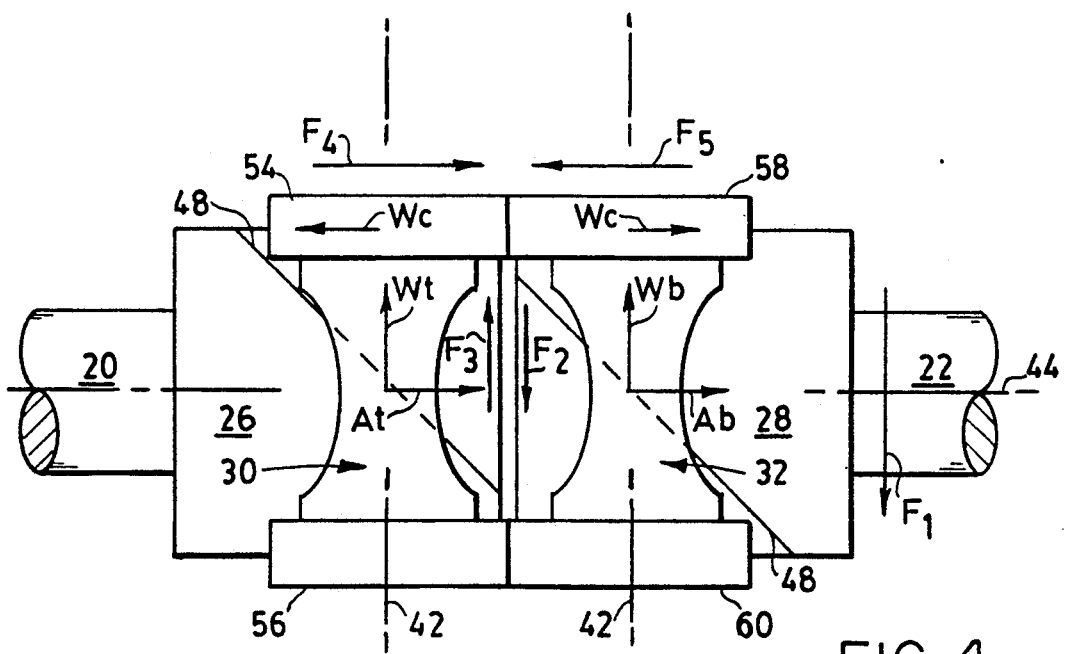
FIG. 4 is a similar schematic view referencing forces involved with the transmission of forward driving torque in the opposite direction of differentiation.

FIGS. 3 and 4 reference some of the forces involved with opposite directions of relative rotation between the drive axles (i.e., differentiation) during the transmission of forward driving torque. Although features of the known differential in common with the two earlier figures are depicted only schematically, the same reference numerals are used. Also, the schematic figures are drawn only to illustrate relative effects between the two directions of differentiation, and this makes possible a number of assumptions that simplify an explanation of the fundamental effects of friction at various interfaces within the differential. The assumptions include: all forces acting at a unit distance from axes of rotation to equate units of force and torque; both side gear helix angles at forty-five degrees to equate axial and tangential components of forces transmitted by the side gear teeth, and a uniform coefficient of friction effective for all considered frictional surfaces.

Forces Wt and Wb refer to the tangential components of forces applied to the respective teeth of the top and bottom side gears 26 and 28 by the transmission of forward driving torque through the differential. Since the helix angles of the side gears are considered at forty-five degrees, the two tangential (or rotational) components Wt and Wb at the respective side gear teeth are equal in magnitude to respective axial components At and Ab that thrust the two side gears along axis 44 toward the flange end of the housing. The two tangential components Wt and Wb are also equal to two axial components that thrust the element gears 30 and 32 along axes 42 against window wall 50, and to two tangential components that encourage a rotational motion about the element gear axes 42. Thus, the terms Wt and Wb refer to the magnitudes of all tangential and axial forces acting on the teeth of the top and bottom gears, respectively. (Note: Since the same components are indicative of so many different forces and torques, no particular convention has been adopted for representing these forces and torques in the drawing figures. Instead, opposing directions and locations of the arrowheads have been selected solely for the conveniences of illustration.)

Frictional torques F1 through F3 are generated in opposition to the rotating directions of the side gears. Frictional torque F1 is equal to the sum of both thrust components At and Ab acting on the side gears multiplied by a coefficient of friction "u" at the interface between the bottom side gear and housing. Frictional torques F2 and F3 are both equal to the thrust At of just the top side gear multiplied by the same coefficient "u" at the interface between the side gears. Substituting Wt and Wb for At and Ab, the magnitudes of the three frictional torques acting at the end faces of the side gears may be expressed as follows:

$$F1 = (Wt + Wb) * u \quad (1)$$

$$F2 = Wt * u \quad (2)$$

$$F3 = Wt * u \quad (3)$$

Although the magnitudes of the frictional torques are calculated in the same way for both directions of relative rotation between drive axles, the directions of the frictional torques vary with the directions of differentiation. For example, FIG. 3 represents a direction of differentiation in which right drive axle 22 is considered rotating slower than left drive axle 20. Frictional torques F1 and F2 oppose the slower rotation of the bottom side gear 28 with respect to the housing, and frictional torque F3 opposes the faster rotation of top side gear 26. In contrast, FIG. 4 represents a direction of differentiation in which frictional torques F1 and F2 oppose the faster rotation of the bottom side gear, and friction torque F3 opposes the slower rotation of the top side gear.

Frictional torques that oppose the slower rotation of either side gear with respect to the housing contribute to the transmission of drive torque from the differential housing to the side gears. Conversely, frictional torques opposing the faster rotation of either side gear also oppose the transmission of drive torque to the side gears. Nevertheless, the sum of torques applied to the side gears, measured at the axle ends, must be substantially equal to the amount of drive torque applied to the differential housing. In the direction of differentiation represented by FIG. 3, the sum of torques Sr transmitted to the side gears can be expressed as follows:

$$Sr = Wt + Wb + F1 + F2 - F3 \quad (4)$$

and by substituting for the frictional terms:

$$Sr = (Wt + Wb) * (1 + u) \quad (5)$$

However, in the opposite direction of differentiation represented by FIG. 4, the signs of the frictional torques are reversed leading to the following expression for the sum of torques S1 in that direction of differentiation:

$$S1 = Wt + Wb - F1 - F2 + F3 \quad (6)$$

and by appropriate substitution:

$$S1 = (Wt + Wb) * (1 - u) \quad (7)$$

From a comparison between the two expressions for the sums of torque Sr and S1 between the two directions of differentiation, it is apparent that for any given torque S applied to the differential housing (i.e., $S = Sr = S1$), the term $(Wt + Wb)$ must be larger in the direction of differentiation represented by FIG. 4 than in the direction of differentiation represented by FIG. 3. This is the basis for the bias imbalance problem as explained in more detail below.

The difference in torque between the drive axles accompanying differentiation is equal to the sum of the frictional torques opposing relative rotation between the drive axles. In other words, the difference torque is the sum of all of the frictional torques, regardless of their direction. For example, considering only the frictional torques (F1 through F3) acting on the end faces of the side gears, the expressions for the difference torque in both directions of differentiation are the same, namely:

$$D = F1 + F2 + F3 \quad (8)$$

and by substitution:

$$D = (3 Wt + Wb) * u \quad (9)$$

Although the expressions for the difference torque D are the same in both directions of differentiation, the magnitudes of that difference are not the same because the sum of terms Wt and Wb differ between the two directions. This is apparent from a comparison between bias ratios (i.e., the ratio of torques between the drive axles) in the two directions of differentiation. Bias ratio is calculated as follows:

$$B = \frac{S + D}{S - D} \quad (10)$$

Since only friction at the end faces of the side gears is being considered, the comparison is made easier by substituting Wo for the equivalent terms Wt and Wb. In the direction of differentiation represented by FIG. 3, bias ratio Brl, or the torque of the right drive axle divided by the torque of the left drive, is calculated as follows:

$$Brl = \frac{1 + 3u}{1 - u} \quad (11)$$

In the opposite direction of differentiation represented by FIG. 4, bias ratio Blr, or the torque of the left drive axle divided by the torque of the right drive axle, is calculated as follows:

$$Blr = \frac{1 + u}{1 - 3u} \quad (12)$$

The direction of differentiation represented by FIG. 3 having the bias ratio Brl is termed the low bias direction, and the opposite direction of differentiation represented by FIG. 4 having the bias ratio Blr is termed the high bias direction.

Thus, considering only the friction (F1 through F3) at the end faces of the side gears, it can be shown that a significant bias imbalance exists between opposite directions of differentiation. However, the imbalance problem may be made worse by friction elsewhere in the differential. For example, FIGS. 3 and 4 also depict frictional torques F4 and F5 that oppose rotation of the top and bottom element gears 30 and 32, respectively. Since the respective axial thrust components imparted to the top and bottom element gears are considered equal to the side gear tangential components Wt and Wb, expressions for the respective frictional torques may be written as follows:

$$F4 = Wt * u \quad (13)$$

$$F5 = Wb * u \quad (14)$$

The additional frictional torques (F4 and F5) opposing relative rotation between drive axles do not affect the above-derived expressions (Sr and S1) for the sum of torques transmitted to the drive axles, but they do affect the common expression for the difference torque (D) between the drive axles. The new expression for the difference torque is as follows:

$$D = (4 Wt + 2 Wb) * u \quad (15)$$

Since the frictional torques F4 and F5 are applied in the gearing connection between side gears, the components Wt and Wb can no longer be considered equal. However, it is possible to separately relate the two components Wt and Wb to a common term Wc representing torque transmitted between the top and bottom element gears. For example, in the low bias direction, the torque Wc is greater than torque Wt by frictional torque F4 and is less than torque Wb by frictional torque F5. Accordingly, components Wt and Wb may be written in terms of torque Wc as follows:

$$Wt = \frac{Wc}{1 + u} \quad (16)$$

$$Wb = \frac{Wc}{1 - u} \quad (17)$$

By substituting the terms in torque Wc in the sum and difference expressions, a new equation for bias ratio in the low bias direction may be written as follows:

$$Brl = \frac{1 - 4u - u^2}{(1 - u)^2} \quad (18)$$

In the high bias direction, the components Wt and Wb are related differently. The torque Wc is less than torque Wt by frictional torque F4 and is greater than torque Wb by frictional torque F5. Accordingly, components Wt and Wb may be written in terms of torque Wc for the high bias direction as follows:

$$Wt = \frac{Wc}{1 - u} \quad (19)$$

$$Wb = \frac{Wc}{1 + u} \quad (20)$$

Once again, by substituting for the terms Wt and Wb, a new bias ratio in the high bias direction may be written as follows:

$$Blr = \frac{(1 + u)^2}{1 - 4u - u^2} \quad (21)$$

By comparison of the two equations for bias ratio in the two directions of differentiation (i.e., equations 18 and 21), it is apparent that the bias ratio imbalance is made worse by the additional frictional torques F4 and F5. From the equations (16 and 19) that compare Wt to Wc, it can be seen that the component Wt is decreased by friction at interface F4 in the low bias direction and is increased by friction at the same interface in the high bias direction. Also, the equation (15) for torque difference also shows that the component Wt contributes twice as much to the torque difference than the component Wb.

Accordingly, a relative reduction in the coefficient of friction "u" at the interface F4 has the effect of increasing the frictional contribution of component Wt in the low bias direction and decreasing the frictional contribution of the component in the high bias direction. This can also be shown by considering the coefficient of friction at the interface F4 equal to zero and deriving new equations for bias ratio in the two directions of differentiation. The component Wt is set equal to Wc; and by substitution, the new bias ratio equations are as follows:

$$Brl = \frac{1 + 3u - 2u^2}{(1 - u)^2} \quad (22)$$

$$Blr = \frac{(1 + u)^2}{1 - 3u - 2u^2} \quad (23)$$

Although the new equations demonstrate only a modest improvement in the bias imbalance problem, they help to demonstrate the importance of avoiding friction at the interface between the drive end of the top element gears and housing as part of an overall strategy for controlling bias ratio in the two directions of differentiation. However, in the reverse drive direction of torque transmission through the differential, the two side gears are thrust in the opposite direction against the cap end of the housing, and the respective effects of the top and bottom gears are reversed. Accordingly, in the reverse drive direction, it is important to relatively reduce the coefficient of friction at the coast ends of the bottom element gears.

Figure 5:
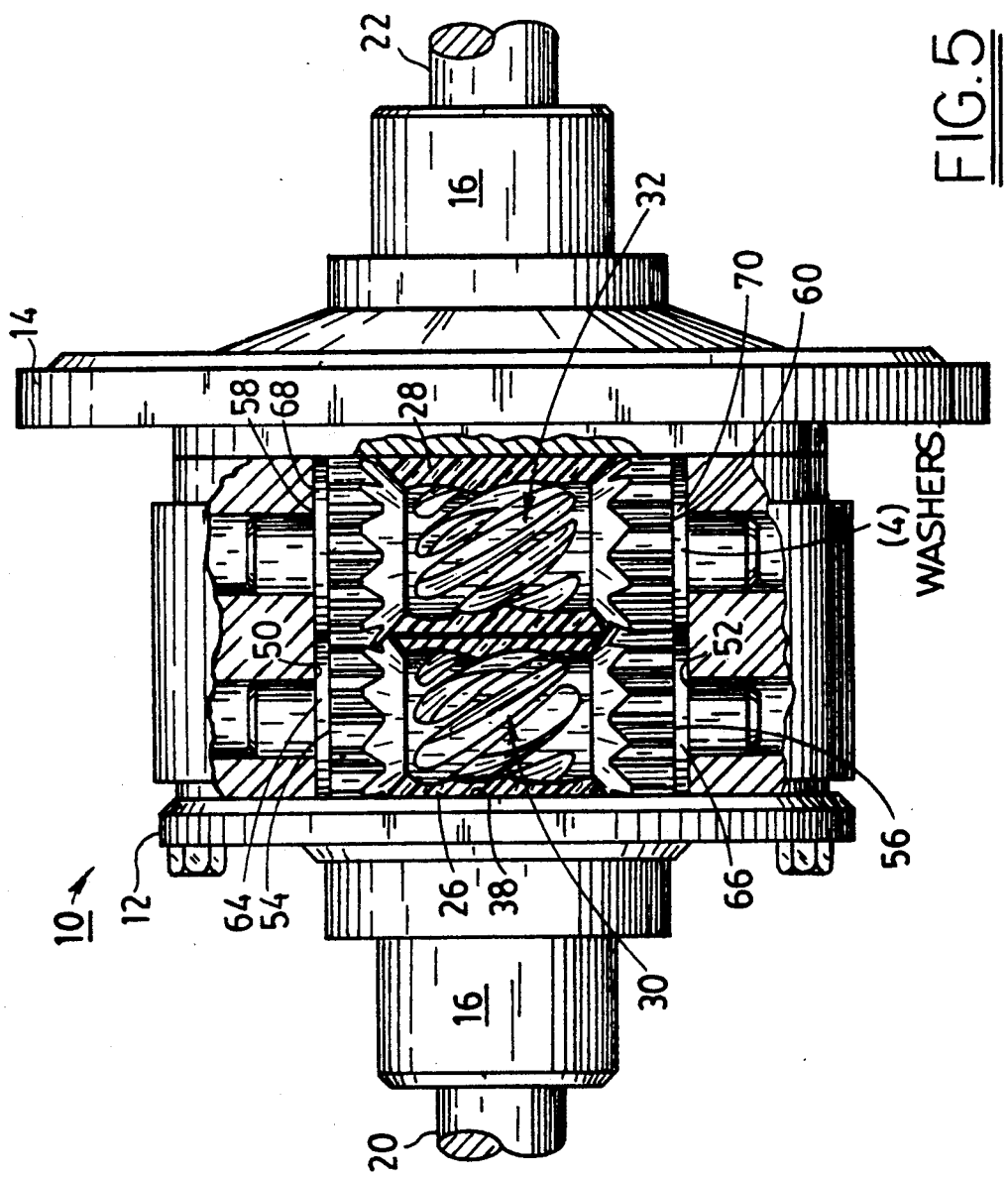
FIG. 5 is a side view similar to FIG. 2, but showing the differential assembly modified to incorporate washers at the ends of the element gears.

FIG. 5 takes the same view as FIG. 2, but shows the differential modified for purposes of controlling friction at the end faces of the element gears. Four different washers are used at the respective end faces of the gears. Conventional washers 66 and 68 are mounted against the coast end faces 56 of the top element gears 30 and against the drive end faces 58 of the bottom element gears 32, respectively. The washers may be made of various materials including steel or bronze having a desired coefficient of friction for controlling the amount of friction between the respective end faces and the opposing window walls 50 and 52. However, washers 64 and 70 take the form of cylindrical roller bearings that are respectively mounted at the drive end faces 58 of the top element gears and at the coast end faces 60 of the bottom element gears. The roller bearings greatly reduce the amount of friction generated between the associated end faces and window walls of the housing.

In place of the different types of washers, it would be possible to vary the coefficients of friction between the same end faces of the top and bottom element gears by using various material coatings applied to either the end faces of the gears or their mounting surfaces on the window walls. For example, it would be possible to apply a friction reducing coating such as Teflon bearing material to the drive end faces of the top element gears and coast end faces of the bottom element gears, without otherwise modifying the structure of the differential. Of course, it would also be possible to provide different coefficients of friction between the top and bottom element gears at only one or the other of the drive and coast end faces to achieve a particular advantage in only one drive direction.

Distinguishing between the frictional interfaces at the drive and coast ends of the element gears also provides an opportunity to control overall bias ratios between the forward and reverse drive directions of torque transmissions through the differential. Higher overall bias ratios in the reverse drive direction may be desirable for two reasons. First, the higher bias ratios in reverse provide additional tractive capabilities for vehicles to help prevent the vehicles from becoming stuck in place. Second, the higher bias ratios in the reverse drive direction provide greater vehicle stability when the vehicle's engine is used to brake the forward motion of the vehicle. Preferably, the higher overall bias ratios in the reverse drive direction are achieved by relatively increasing the coefficient of friction at the coast end faces of the bottom element gear with respect to the drive end faces of the top element gears. The respective coefficients of friction at the drive and coast ends of the element gears can be controlled by using individual friction modifying washers at the end faces of the top and bottom element gears or by using plates covering the common end faces of both element gears.

The bias ratio imbalances between opposite directions of differentiation also pose structural problems to differential design. As a consequence of the imbalance, the drive end faces of the top element gears receive the highest thrust forces. The reason for this is twofold. In the high bias direction of differentiation, the top element gear receives more thrust than the bottom element gear, and the total thrust received by both element gears is larger than in the low bias direction. The higher thrust forces impose a twisting moment on the differential housing at a distance from the flange end of the housing at which drive torque is applied. Accordingly, the housings must be designed to accommodate the additional thrust, or appropriately rated to limit amounts of drive torque that can be accommodated by the design.

Although it is known that helical gears could be substituted for the spur gears at the ends of the element gears to provide the equivalent function of transmitting power between two parallel axes, the present invention provides for using a particular direction of helix angles on the gears to help balance end thrusts imparted to the end faces of the element gears. The directions of the helix angles for the gears are selected so that the helical gears generate thrust forces that oppose the transmission of thrust forces against the drive end of the top element gears and contribute an equal amount of additional thrust against the drive end faces of the bottom element gears. In other words, the helical gears help to redistribute thrust acting at the end faces of the element gears to prevent excessive concentrations of thrust at the drive end of the top element gears. Beyond a small additional amount of friction at the helical gear meshes, the substitution of helical gears for the spur gears does not significantly affect either overall bias ratios or the bias ratio imbalance.

Figure 6:
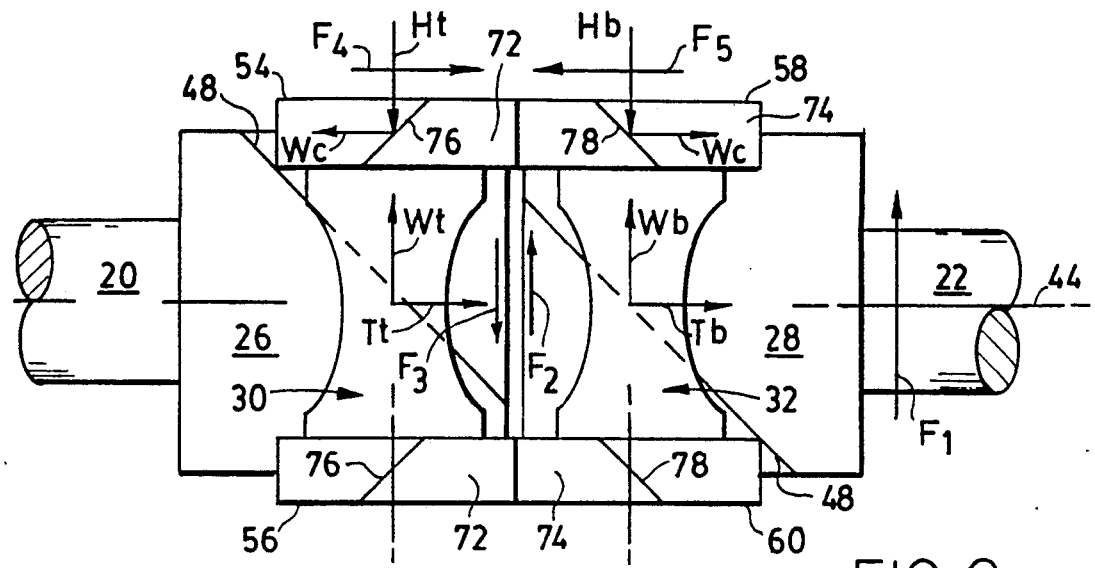
FIG. 6 is another schematic taken in the same direction of differentiation represented by FIG. 3, but also showing forces generated by the substitution of helical gears in place of spur gears at the ends of the element gears.
Figure 7:
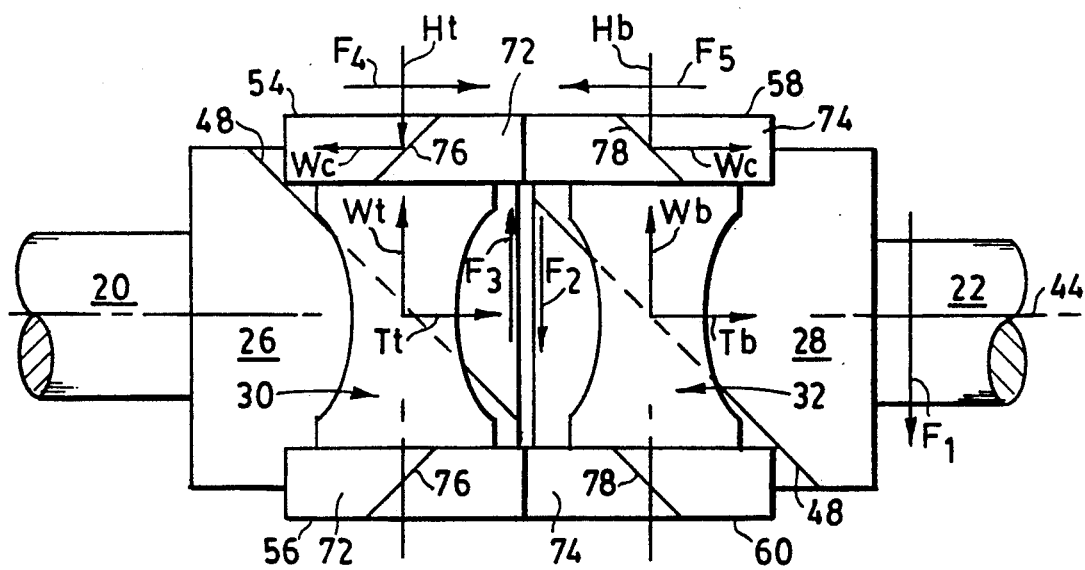
FIG. 7 is another schematic view in the direction of differentiation previously referenced by FIG. 4, but also showing the same helical gear effects of the previous figure.

FIGS. 6 and 7 are also schematic drawings showing the distribution of thrust forces acting on the element gears in the forward drive direction. However, in place of the spur gear portions of the previous illustrations, respective helical gear portions 72 and 74 are formed at the ends of top and bottom element gears. The helical gear portions 72 and 74 have respective mating teeth 76 and 78 that are inclined to equal helix angles in opposite directions. However, the directions of the helix angles are selected to generate equal but opposite thrust forces Ht and Hb; the thrust force Ht opposing the thrust force Wt, and the thrust force Hb contributing to the thrust force Wb.

The amount of thrust exerted by the ends of the element gears against window wall 50 is equal to the combined effects of both thrust forces acting on the element gears. For example, the thrust exerted by the top element gear 30 against window wall 50 is found by subtracting helical gear thrust force Ht from the thrust force Wt of the top side and element gear mesh. Similarly, the thrust exerted by bottom element gear 32 against the same window wall is found by adding the thrust force Hb to the thrust force Wb of the bottom side and element gear mesh. Thus, the same total thrust is exerted by the element gears against window wall 50, but less of the thrust is exerted by the top element gears and more of the thrust is exerted by the bottom element gears.

The directions of the thrust forces Ht and Hb are not affected by opposite directions of differentiation. Also, the use of helical gears, by themselves, do not affect overall bias ratios or the bias imbalance. However, the thrust forces Ht and Hb, along with the thrust forces Wt and Wb, are reversed by the transmission of reverse drive torque through the differential. Although the helical gears distribute more thrust to the top element gears in the reverse drive direction, the bias imbalance in that direction normally loads the bottom element gear more, and the overall effect of the helical gears is to balance the amount of thrust exerted by the top and bottom element gears.

The helical gears may also be used together with variations in the coefficients of friction between the element gear end faces to better control the distribution of thrust forces as well as the relative amounts of friction generated at the different element gear end faces. In addition, these improvements may be made as part of an overall strategy for controlling bias ratios incorporating the prior teaching relating to controlling friction at the end faces of the side gears.

We claim:

1. A differential assembly comprising:
   a housing that is rotatable in opposite directions by forward and reverse driving torque;
   means formed in said housing for receiving a pair of axle ends;
   a pair of side gears mounted within said housing for rotation with the axle ends about a common axis of rotation and having respective teeth oriented to helix angles in a same general direction with respect to the common axis of side gear rotation;
   pairs of element gears rotatively mounted in said housing about respective axes of rotation that are crossed and nonintersecting with respect to the common axis of side gear rotation;
   a first element gear of each of said pairs of element gears meshing with one of said side gears, a second element gear of each of said pairs of element gears meshing with the other of said side gears, and said first and second element gears of each pair meshing with each other;
   said first element gears including end faces defining, together with associated mounting surfaces in said housing, first frictional interfaces, said second element gears including end faces defining, together with associated mounting surfaces in said housing, second frictional interfaces, and said first and second frictional interfaces providing for resisting respective rotations of said first and second element gears in response to torque being transmitted by said first and second element gears;
   a first means cooperating with said first element gear end faces modifying the frictional resistance of said first frictional interfaces and a second means cooperating with said second element gear end faces modifying the frictional resistance of said second frictional interfaces; and
   said first and second frictional interfaces exhibiting different coefficients of friction.

2. The differential assembly of claim 1 in which helical gear portions are formed at said end faces of said first and second element gears, said helical gear portions of the first and second element gears having respective teeth oriented at helix angles in opposite directions for balancing thrust forces transmitted by said first and second element gears against said first and second frictional interfaces.

3. The differential assembly of claim 1 in which said one and the other side gear are defined as bottom and top side gears, both of said side gears subject to being thrust along their axes toward one end of said differential housing by forward driving torque transmitted by the differential, said bottom side gear being located closest to said end of the housing toward which the side gears are thrust, and said top side gear being located adjacent to said bottom side gear.

4. The differential assembly of claim 3 in which said first and second element gears are respective bottom and top element gears in mesh with each other, said bottom element gears also being in mesh with said bottom side gear, and said top element gears also being in mesh with said top side gear.

5. The differential assembly of claim 4 in which said element gears include drive and coast end faces, said element gears being subject to thrust against said housing on said drive end faces in response to the transmission of forward driving torque, and said element gears being subject to thrust against said housing on said coast end faces by reverse driving torque.

6. The differential assembly of claim 5 in which said frictional interfaces at said drive end faces of said bottom element gears exhibit a higher coefficient of friction than said frictional interfaces at said drive end faces of said top element gears.

7. The differential assembly of claim 6 in which said frictional interfaces at said coast end faces of said top element gears exhibit a higher coefficient of friction than said frictional interfaces at said coast end faces of said bottom element gears.

8. The differential assembly of claim 5 in which said frictional interfaces at said coast end faces of said top element gears exhibit a higher coefficient of friction than said frictional interfaces at said drive end faces of said bottom element gears.

9. The differential assembly of claim 8 in which said frictional interfaces at said drive end faces of said bottom element gears exhibit a higher coefficient of friction than said frictional interfaces at said drive end faces of said top element gears.

10. A differential for use in a vehicle drive line comprising:
    a housing rotatable by both forward and reverse driving torque about an axis common to two drive shafts of the drive line;
    means for receiving ends of the two drive shafts within said housing;
    a pair of side gears mounted between opposite ends of said housing, having means for being coupled to the drive shaft ends within the differential for rotation about the common axis of rotation, and including teeth oriented to respective helix angles in a same general direction with respect to the common axis of rotation;
    at least one pair of element gears rotatively mounted in the housing about respective axes of rotation that are crossed and nonintersecting with respect to the common axis of rotation of said side gears; one element gear of said pair meshing with one of said side gears, the other element gear of said pair meshing with the other of said side gears, and both element gears of said pair meshing with each other;
    said side gears being distinguished as bottom and top side gears, both of said side gears subject to being thrust toward one of said ends of the housing by forward driving torque transmitted by the differential, said bottom side gear being located closest to said end of the housing toward which the side gears are thrust, and said top side gear being located adjacent to said bottom side gear;
    said element gears being distinguished as bottom and top element gears, said bottom element gear being in mesh with said bottom side gear, said top element gear being in mesh with said top side gear, and said bottom and top element gears being in mesh with each other;
    two ends of said element gears being distinguished by drive and coast end faces, said element gears being subject to thrust against said housing on said drive end faces in response to the transmission of forward driving torque, and said element gears being subject to thrust against said housing on said coast end faces by reverse driving torque;
    each of said end faces defining respective frictional interfaces with said housing that resist rotation of said element gears in response to driving torque being transmitted by said element gears;
    said drive end face of said top element gear defining, together with said housing, a first frictional interface and said drive end face of said bottom element gear defining, together with said housing, a second frictional interface;
    means varying frictional resistance of said first and second frictional interfaces; and
    said means varying frictional resistance providing for reducing frictional resistance of said first frictional interfaces with respect to said second frictional interfaces.

11. The differential of claim 10 in which said means varying frictional resistance comprises a friction reducing coating applied to said first frictional interface.

12. The differential of claim 10 in which said means varying frictional resistance comprises a friction reducing washer mounted within said first frictional interface.

13. The differential of claim 10 in which said coast end face of said top element gear defines, together with said housing, a third frictional interface, and said coast end face of said bottom element gear defines, together with said housing, a fourth frictional interface; and including further means varying frictional resistance of said third and fourth frictional interfaces, said further means varying frictional resistance providing for reducing frictional resistance of said fourth frictional interface with respect to said third frictional interface.

14. The differential of claim 13 in which helical gear portions are formed at said end faces of said top and bottom element gears having respective teeth oriented at helix angles in opposite directions for balancing thrust forces transmitted by said first and second element gears against said first and second frictional interfaces.

* * * * *